Figure 1:
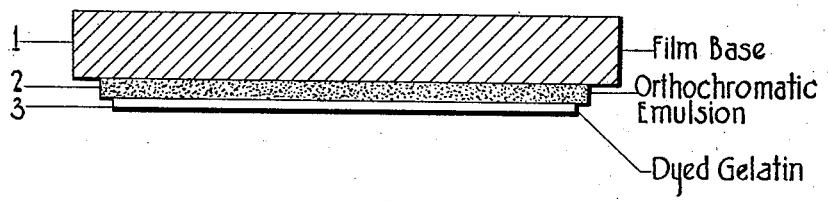
Figure 2:
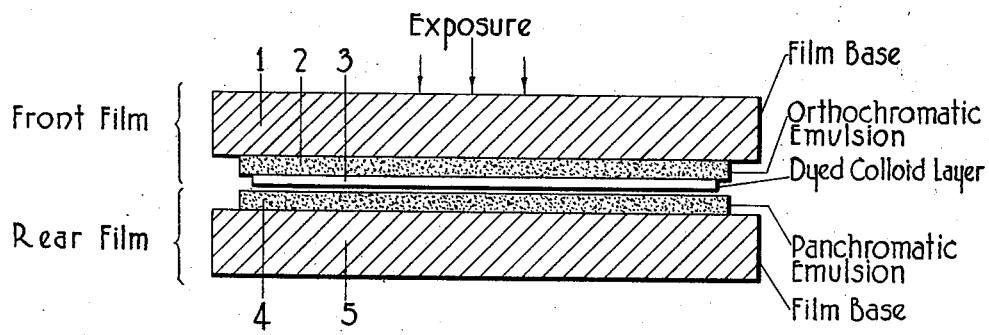

March 7, 1933.   V. B. SEASE   1,900,468

MULTIPACK NEGATIVE SYSTEM

Filed June 19, 1930

Virgil B. Sease, Inventor

By his attorney

Ralph F. Miller

Patented Mar. 7, 1933

1,900,468

UNITED STATES PATENT OFFICE

VIRGIL B. SEASE, OF PARLIN, NEW JERSEY, ASSIGNOR TO DU PONT FILM MANUFACTURING CORPORATION, OF WILMINGTON, DELAWARE, A CORPORATION OF DELAWARE

MULTIPACK NEGATIVE SYSTEM

Application filed June 19, 1930. Serial No. 462,197.

This invention relates to color separation negatives and more particularly to an improved multi-pack negative system.

Many methods have been devised for making color separation negatives for use in color photography. Many of these methods require special cameras with filter attachments, prisms, reflectors, etc. Perhaps the easiest method for making color separation negatives has been the bi-pack and tri-pack arrangements wherein two or three negatives are stacked upon each other and loaded in the ordinary cameras. Naturally these negatives require a certain degree of transparency in the front negative and in the middle negative when a tri-pack is used.

In the usual bi-pack system the composite negative consists of two negatives arranged with their light-sensitive emulsions adjacent each other. It has been customary to stain the emulsion of the negative, through which the exposure is made, a color substantially opaque to the light rays to which this first negative is sensitive, but transparent to those light rays capable of affecting the second sensitive emulsion. The principle is the same in the tri-pack system, the arrangement differing merely in that three light-sensitive emulsions are used the middle of which is also dyed or stained to obtain the desired light filtering effect. The stains used are non-color sensitizing dyes which cut out wave lengths of light which are not desired to register on the emulsion layer behind.

In a bi-pack system it is customary to have the emulsion on the front film sensitive to blue and green rays only, and stained an orange or red color which passes only the yellow and red rays to the emulsion on the back film, which emulsion is usually a panchromatic emulsion. It is customary to place the two films in a bi-pack system, emulsion to emulsion, and to expose through the celluloid layer of the front film.

Several disadvantages result from the practice of mixing the filtering dye with the emulsion. The dye usually alters the speed and contrast characteristics undesirably. This undesirable effect cannot be wholly avoided by attempting to stain the outer portion only of the emulsion layer by bathing in a dye bath because practically all dyes show considerable penetration into the emulsion layer. It has been suggested that the surface of the emulsion be treated with gum, waxes, or other substances upon which an alcoholic dye solution may be flowed to obtain a filter without penetration of the dye into the emulsion layer. In such cases it is found that the material which hinders the penetration of the dye likewise interferes with the penetration of the developer when the film is processed and undesirable pictorial results are therefore obtained. Another disadvantage that has prevented a wider use of the bi- or tri-pack system is the deleterious effect resulting from the scattering or diffusion of the light rays that takes place between the surfaces of the light sensitive emulsions.

This invention has as an object the production of a multi-pack negative system that is inherently capable of higher speed and better contrast characteristics than the known negative systems of this kind. Another object is the production of a multi-pack negative system in which the light-sensitive emulsion is free from the presence of dyes, stains or other matter interfering with the proper development of the film. A further object is the production of a multi-pack negative system in which light scattering between the emulsions is reduced or eliminated. A further object is the production of light-sensitive emulsion covered by a coating of stained light-transmitting material. A further object is the production of a light-sensitive emulsion covered by a coating of light-transmitting colloid. A still further object resides in a novel method of applying a coating of colloid to a light-sensitive emulsion. Other objects will appear hereinafter.

These objects are accomplished by the following invention in which a layer of dyed colloid is interposed between the emulsions of a multi-pack film, the colloid layer being preferably applied as a coating to the surface of an emulsion.

In the drawing:

Fig. 1 is a section showing the arrangement of parts of my improved film, and Fig.

2 is a section of a bi-pack negative system embodying my improved film.

My invention is illustrated in connection with a bi-pack negative system wherein the base 1 of the front film or negative carries an orthochromatic emulsion which is sensitive to the blue and green light rays. The rear film base 5 carries a panchromatic emulsion 4 which is sensitive to the red light rays. Interposed between these emulsions is a light screen comprised of a layer or film of colloid, stained or dyed to screen out all but the red light rays. I prefer to apply this colloid light screen as a coating on the surface of the orthochromatic emulsion by preparing separately, a dyed colloid, such as gelatin, agar, casein, etc., and coating it on the emulsion layer in a separate operation during manufacture in the same manner that the emulsion is coated. For example, one gram of Luxol Fast Red B is mixed in a solution of twenty-five grams of gelatin and 300 cc. of water. Twelve cc. of a 10% solution of potassium alum is added at this point to fix the color in the gelatin. Formaldehyde or certain salts which exert a hardening action on gelatin may also be used. This mixture is then chilled and set to a jelly, shredded and washed to remove excessive dye, and then melted and diluted to any desired degree for coating. Working in this manner, the dye is mordanted upon the gelatin it is desired to stain and there is no bleeding whatever of the dye into the emulsion layer.

If a tri-pack negative system is used the rear face of the middle negative also carries a coating of colloid dyed so as to screen out the light not desired to pass through to the third negative.

It is to be understood that the invention is not limited to the particular kind or arrangement of the light sensitive coatings or emulsions used, but comprehends a system in which the emulsion on the exposure side is sensitive to light rays of appropriately selected wave lengths while a rear emulsion is sensitive to light rays of a different wave length, the described light screen being transparent to these latter light rays and substantially opaque to the light rays to which the emulsion on the exposure side is sensitive.

The films after being developed are printed onto a single positive which is thereafter dyed. The printing and dying steps form no part of the present invention and are, therefore, not referred to in detail.

While I have found colloids to be the most effective as mediums for carrying the light filtering substance in the form of a dye or stain, it will be apparent that the invention is not restricted to this class of materials but may be practiced by using other separately prepared dyed coatings having substantially the same characteristics as colloid coatings.

When the dyed gelatin is coated on the emulsion surface, a fusion takes place, and since there is no difference in the index of refraction between the colloid of the emulsion and the colloid of the dye layer, it becomes impossible to detect any surface at the original face of the emulsion. The dyed colloid layer could of course, be coated on the rear emulsion layer instead of on the front emulsion layer.

Because of the application of the dye to a separately applied coating, instead of to the emulsion itself, there is no undesirable alteration of the speed, contrast characteristics, or other photographic quality of the emulsion.

By my improved method of applying the stain or dye to a coating separate from the emulsion I am better able to control the amount of dye applied. The depth of the filter may be controlled by the amount of colloid applied. The uniformity of the filter is much better than can be obtained by dipping or bathing the emulsion because emulsion coatings vary from one area to another in penetratability. This lack of uniformity is evidenced by the fact that the process of development, because of uneven penetration of developer, must be carried out fully as to time to secure uniform development.

Another important advantage resulting from the dyed colloid layer is a sharper image on the rear film made possible by the better contact of the colloid layer with the rear emulsion and by the smooth surface of the colloid layer as compared to the surface of the emulsion. The sharpness of the rear negative is largely dependent upon the degree of contact its emulsion surface makes with the emulsion surface of the front film. A colloid layer such as gelatin, as will be apparent, will make better contact with the rear emulsion than will the front emulsion. I have found furthermore, that the main reason for lack of sharpness on the rear film is not due so much to the fact that the emulsions are separated, as to the light scattering effect of the emulsion surfaces. A negative emulsion surface is granular or discontinuous and has a distinct matt appearance due to the separate particles of silver bromide crystals. The light is scattered and diffused by such a surface, the effect increasing with increasing separation of the emulsion surfaces. The colloid layer of the present invention on the other hand, has a smooth continuous surface, which together with the better contact with the emulsion, permits the light rays to pass undistorted from the front to the rear film.

As many apparently widely different embodiments of this invention may be made without departing from the spirit and scope thereof, it is to be understood that I do not limit myself to the specific embodiments thereof except as defined in the appended claims.

I claim:

1. In the manufacture of a color separation negative suitable for use in a multipack negative system, the steps of adding a dye to a solution of a colloid, mordanting the dye on the colloid, and applying a coating of the dyed colloid on a light-sensitive emulsion.

2. In the manufacture of a color separation negative suitable for use in a multipack negative system, the steps of adding a dye to a solution of a colloid, mordanting the dye on the colloid, causing the colloid to set to a jelly, melting the jelly and diluting to the desired degree, and applying a coating of the colloid so prepared on a light-sensitive emulsion.

3. In the manufacture of a color separation negative suitable for use in a multi-pack negative system, the steps of adding a dye to a solution of a colloid, mordanting the dye on the colloid, causing the colloid to set to a jelly, washing the jelly to remove excess dye, melting the jelly and diluting to the desired degree and applying a coating of the colloid on a light-sensitive emulsion.

4. A color separation negative material suitable for use in a multipack system, said negative material comprising a transparent support, a light sensitive emulsion upon said support, said emulsion having coalescently coated thereon a relatively thin transparent, water permeable gelatinous coating, said gelatinous coating having a light filtering dye mordanted therein.

5. In a multipack negative system a front member comprising a transparent support, a light sensitive emulsion upon said support, said emulsion having coalescently coated thereon a transparent, water permeable, smooth surfaced, relatively thin gelatinous coating to minimize the scattering of light, said gelatinous coating having a light filtering dye mordanted therein.

In testimony whereof, I affix my signature.

VIRGIL B. SEASE.